United States Patent
Gasko et al.

(10) Patent No.: US 6,167,645 B1
(45) Date of Patent: Jan. 2, 2001

(54) LICENSE PLATE BRACKET

(75) Inventors: David J. Gasko, Rochester; Paul A. Martin, Birmingham; Michael N. Fisher, Ira Township, all of MI (US)

(73) Assignee: Chrysler Corporation, Auburn Hills, MI (US)

(*) Notice: Under 35 U.S.C. 154(b), the term of this patent shall be extended for 0 days.

(21) Appl. No.: 09/105,351

(22) Filed: Jun. 26, 1998

(51) Int. Cl.$^7$ ..................................................... G09F 7/00
(52) U.S. Cl. ........................ 40/200; 40/209; 40/643; 40/591; 293/115
(58) Field of Search ........................ 40/200, 209, 643, 40/666, 658, 591, 910; 248/220.21; 293/115; 180/68.6

(56) References Cited

U.S. PATENT DOCUMENTS

| | | | |
|---|---|---|---|
| D. 154,747 | * 8/1949 | Bustin | D12/171 |
| 1,092,887 | * 4/1914 | Adams | 40/200 |
| 1,248,043 | * 11/1917 | Ware | 40/209 |
| 1,274,668 | * 8/1918 | Blair | 40/643 |
| 1,471,164 | 10/1923 | Impol . | |
| 1,481,937 | 1/1924 | Thorn . | |
| 1,620,798 | * 3/1927 | Butler | 40/643 |
| 1,701,106 | * 2/1929 | Gohn | 40/643 |
| 1,894,233 | * 1/1933 | Ellis | 40/643 X |
| 1,898,024 | 2/1933 | Von Hacht . | |
| 1,930,307 | * 10/1933 | Croes | 40/643 |
| 1,936,711 | * 11/1933 | Doughty | 40/200 |
| 2,494,179 | * 1/1950 | King | 40/643 X |
| 2,921,395 | * 1/1960 | Fishman | 40/209 |
| 3,173,219 | * 3/1965 | Yarder | 40/209 X |
| 3,206,883 | * 9/1965 | Crawford | 40/643 X |
| 3,335,467 | * 8/1967 | Freed | 40/666 X |
| 3,379,402 | * 4/1968 | Trammell, Jr. | 40/209 X |
| 3,509,653 | * 5/1970 | Hummel | 40/200 X |
| 4,302,896 | 12/1981 | Bott | 40/209 |
| 4,314,417 | * 2/1982 | Cain | 40/209 |
| 4,736,539 | * 4/1988 | Dickinson | 40/643 X |
| 4,970,809 | * 11/1990 | Bushbaum | 40/209 |
| 5,547,306 | * 8/1996 | Zakrajsek | 403/202 |
| 5,581,852 | * 12/1996 | Zakrajsek | 24/289 |
| 5,813,640 | * 9/1998 | Koch et al. | 40/200 X |
| 5,863,019 | * 1/1999 | Rose et al. | 40/658 X |
| 5,870,841 | * 2/1999 | Brody, II et al. | 40/643 X |

FOREIGN PATENT DOCUMENTS

| | | | |
|---|---|---|---|
| 682898 | * 12/1993 | (CH) | 40/209 |
| 3926651 | * 5/1991 | (DE) | 40/200 |

* cited by examiner

*Primary Examiner*—Terry Lee Melius
*Assistant Examiner*—Andrea Chop
(74) *Attorney, Agent, or Firm*—Lawrence J. Shurupoff

(57) ABSTRACT

A license plate bracket includes a pair of resilient hooks for hooking the bracket to the grille of a vehicle. The hooks, in part, replace conventional hardware such as screws and bolts which are incompatible with the thin plastic ribs found on modern vehicle front grilles. The entire bracket, including the hooks, can be formed as a one-piece plastic molding.

2 Claims, 6 Drawing Sheets

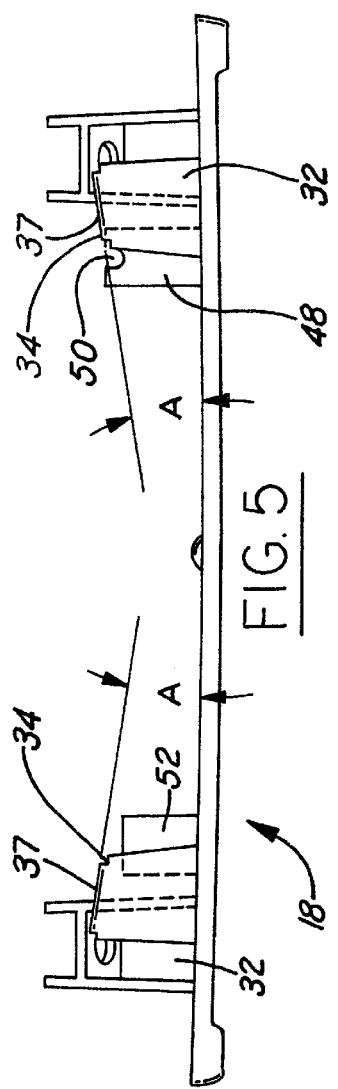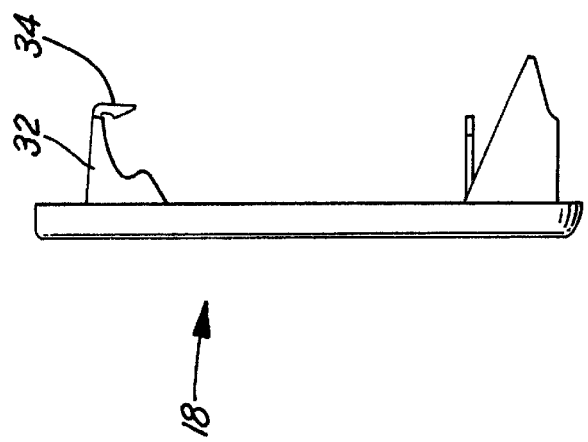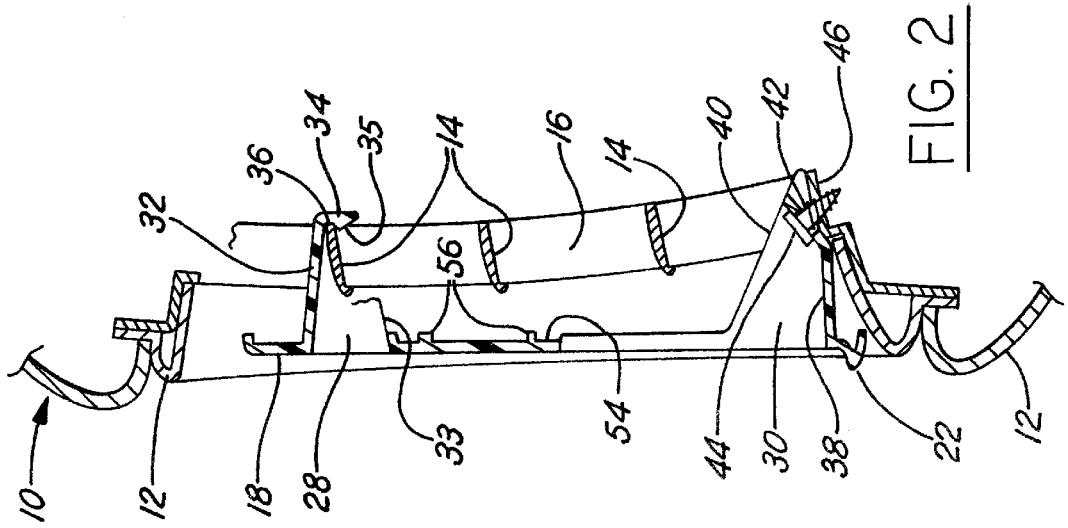

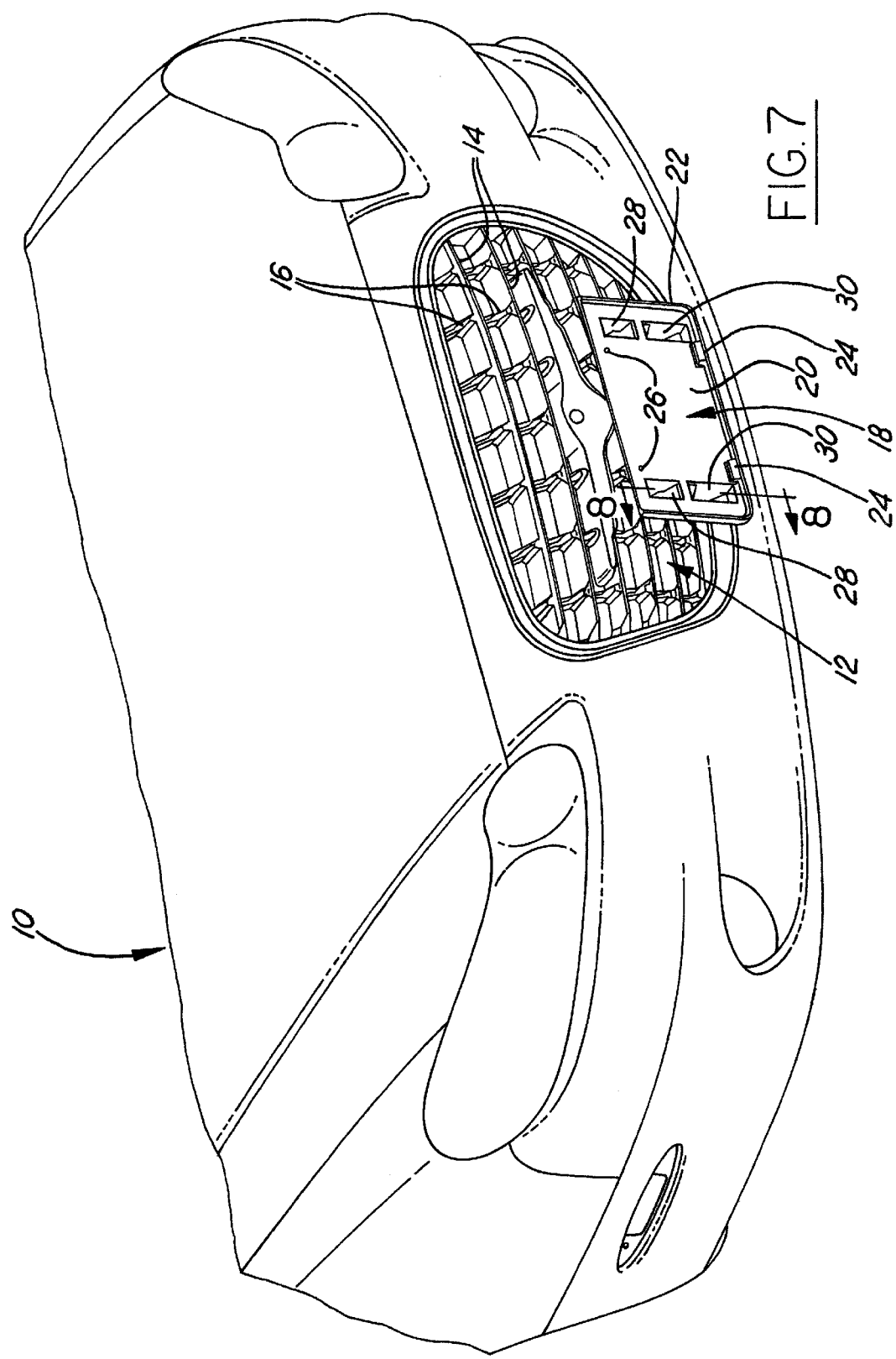

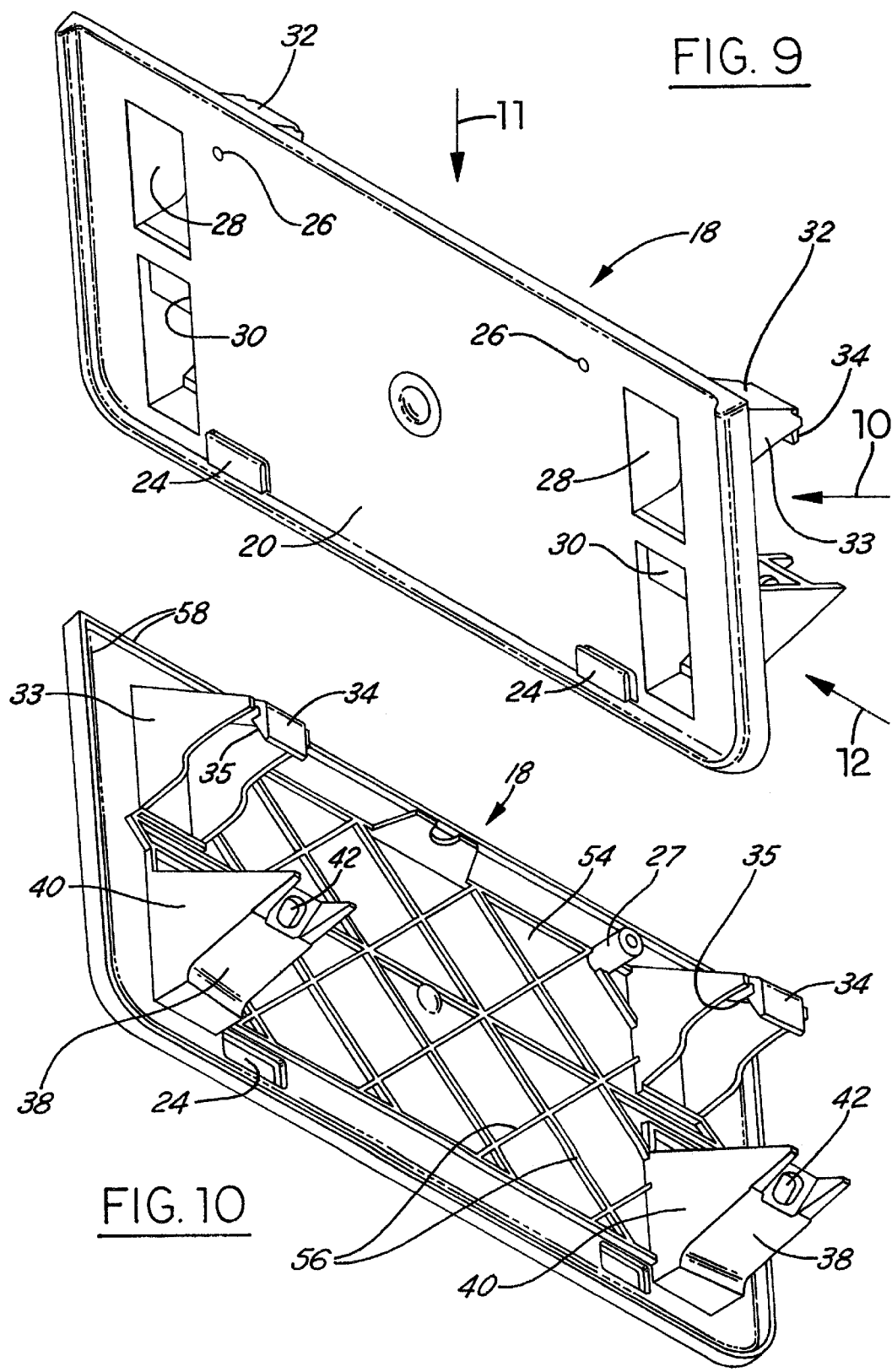

LICENSE PLATE BRACKET

BACKGROUND OF THE INVENTION

1. Field of the Invention

The present invention relates in general to brackets for mounting license plates to vehicles and in particular to a bracket adapted to be at least partially clipped to a front grille or fascia of an automobile.

2. Description of Prior Developments

License plate brackets have been in use in many forms to secure a license plate to the body of a vehicle. Generally, screws or bolts are used to mount such brackets to a vehicle bumper to provide a planar mounting surface for holding a license plate. Although such brackets generally function adequately, new vehicle designs have created a problem with respect to the anchoring of such brackets to a bumper.

In particular, new vehicle designs have covered the front bumper area with a plastic grille. In this case, there is insufficient support or available surface area to attach a license plate bracket to the thin plastic grille bars using conventional fasteners such as bolts and screws. Trying to thread screws into the thin grille can break the grille bars and result in little or no support for the license plate bracket.

Accordingly, a need exists for a license plate bracket adapted to mount a license plate to the grille of a vehicle, particularly where the grille extends in front of and covers the front bumper.

SUMMARY OF THE INVENTION

The present invention has been developed to fulfill the needs noted above and, therefore, has as an object the provision of a license plate bracket which is adapted to be securely retained on the grille of an automobile without the use of a traditional hardware mounting arrangement.

Another object is to provide a license plate bracket which can be quickly and easily attached to a thin rib or bar of a vehicle front grille so that the use of screws or bolts is at least partially obviated.

BRIEF DESCRIPTION OF THE DRAWINGS

FIG. 2 is a view in section taken through section line 2—2 of FIG. 1;

FIG. 5 is a bottom view of the bracket of FIG. 1;

FIG. 6 is a right side view of the bracket of FIG. 1;

FIG. 7 is a perspective view of a license plate bracket constructed in accordance with a second embodiment of the invention and attached to the front grille of a vehicle;

FIG. 9 is a perspective view of the front of the bracket of FIG. 7;

FIG. 10 is a perspective view of the back of the bracket of FIG. 7;

In the drawings, like reference numerals denote like or similar parts.

DETAILED DESCRIPTION OF THE PREFERRED EMBODIMENT

The invention will now be described in conjunction with the drawings, beginning with FIG. 1, which shows the front end of a vehicle 10 having a front grille 12 in the form of a lattice of thin plastic horizontal ribs or bars 14 and thin plastic vertical ribs or bars 16. The grille 12 in this particular vehicle design is located at least in part over and in front of the front bumper of the vehicle. With this grille and bumper construction, there is insufficient support space to mount a conventional license plate bracket on the bumper area. What is needed is a license plate bracket which can be attached at least in part to the grille.

Figure 1:
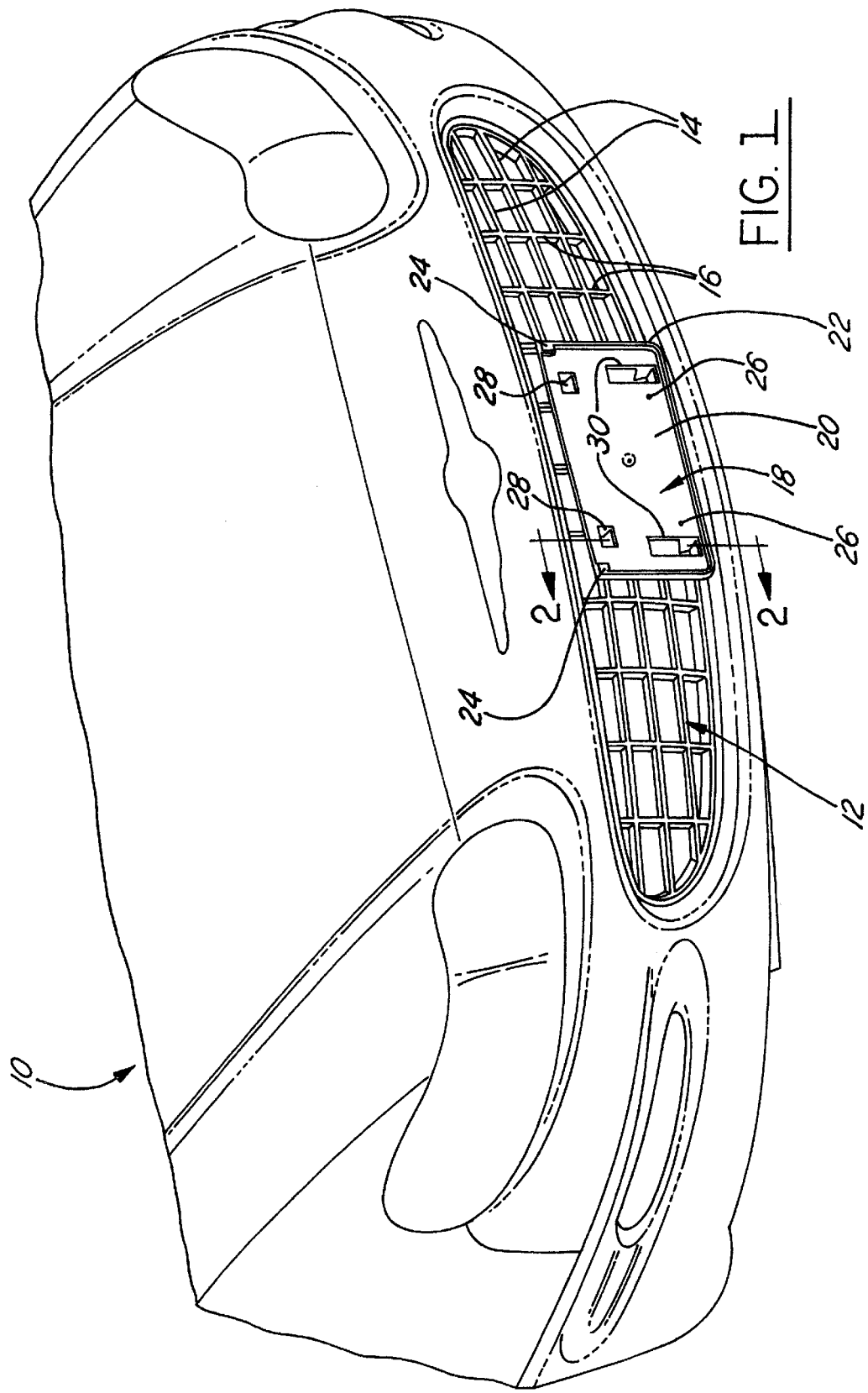
FIG. 1 is a perspective view of a license plate bracket constructed in accordance with the invention and shown mounted on the front grille of a vehicle.

As further seen in FIGS. 1 through 7 and particularly in FIGS. 1 and 2, a generally rectangular license plate support member in the form of bracket 18 is mounted directly on the grille 12. Bracket 18 has a substantially flat, planer front face 20 bordered by a peripheral U-shaped ridge 22 which extends around the bottom and two side edges of the bracket for centering and holding a license plate in place on the bracket. Two hold-down tabs 24 are located in the upper corners of the bracket 18 for further supporting the corners of a license plate and minimizing rattling of the license plate by extending over and clipping the plate in place thereby preventing the top of the license plate from flexing outwardly.

Bracket 18 further includes a pair of mounting holes 26 for receiving a pair of mounting screws for screwing a license plate to the front face 20 of bracket 18. When a license plate is inserted under the hold-down tabs 24 and centered on the bracket 18, it may be screwed in position and held to the surface of the bracket with only two screws.

Figures 3, 4:
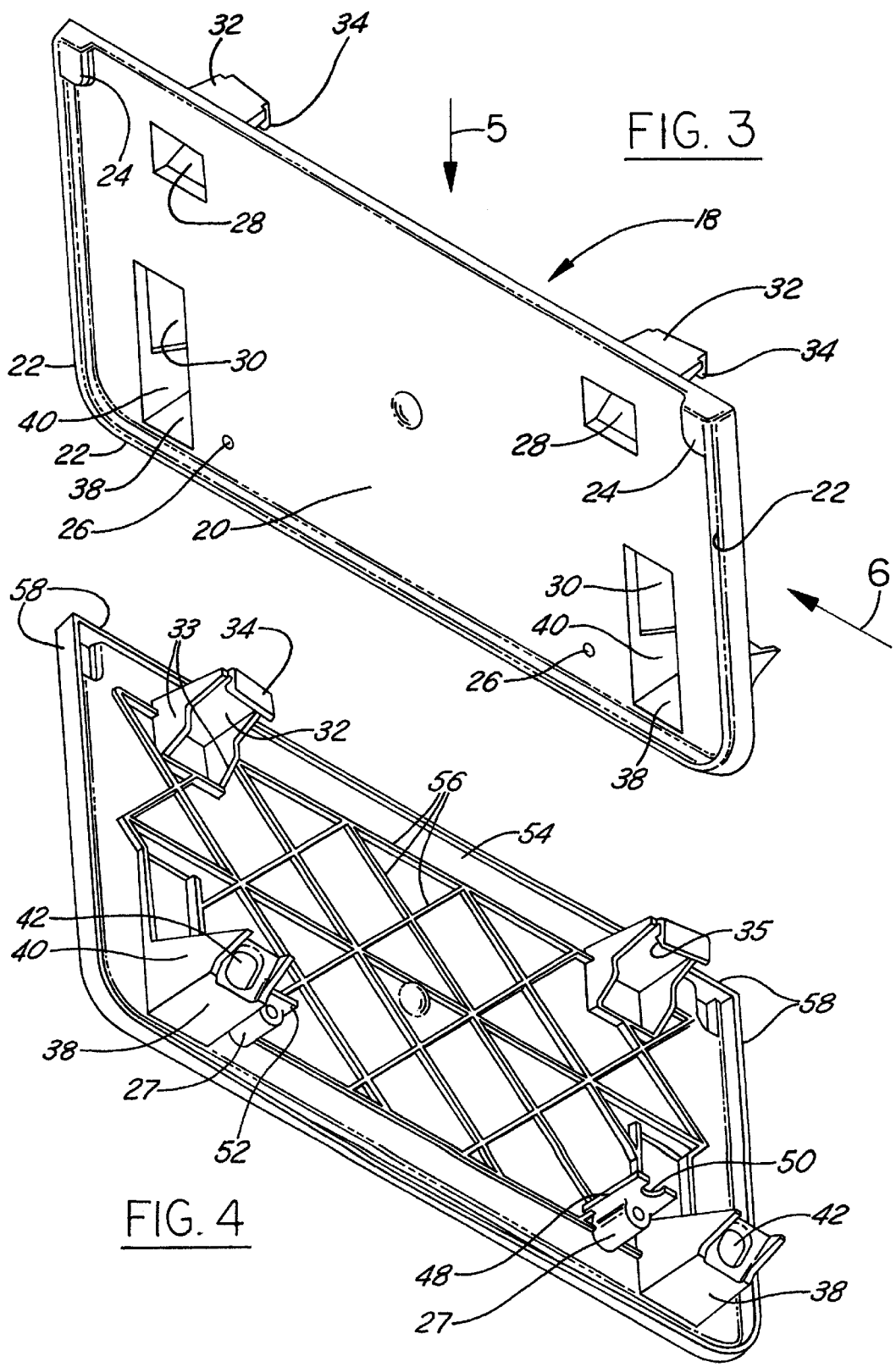
FIG. 3 is a perspective view of the front of the license plate bracket of FIG. 1.
FIG. 4 is a perspective view of the rear of the license plate bracket of FIG. 1.
Figure 11:
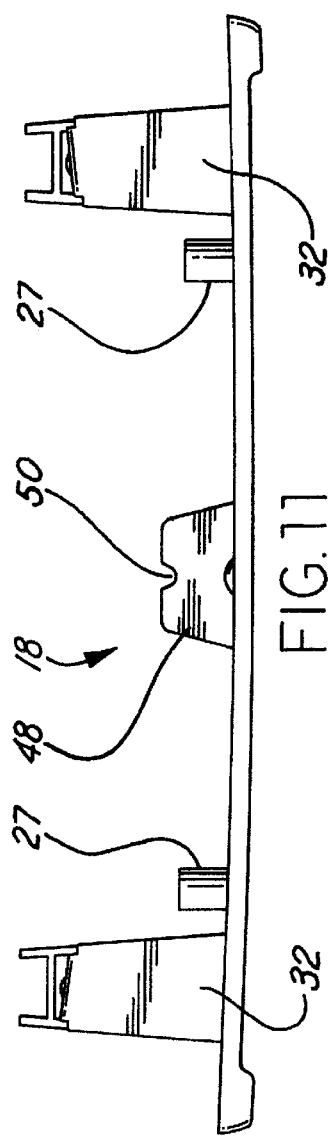
FIG. 11 is a top view of the bracket of FIG. 7.
Figure 12:
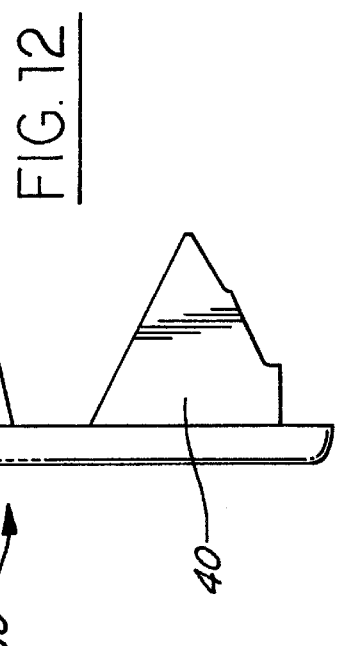
FIG. 12 is a right side view of the bracket of FIG. 7.
Figure 8:
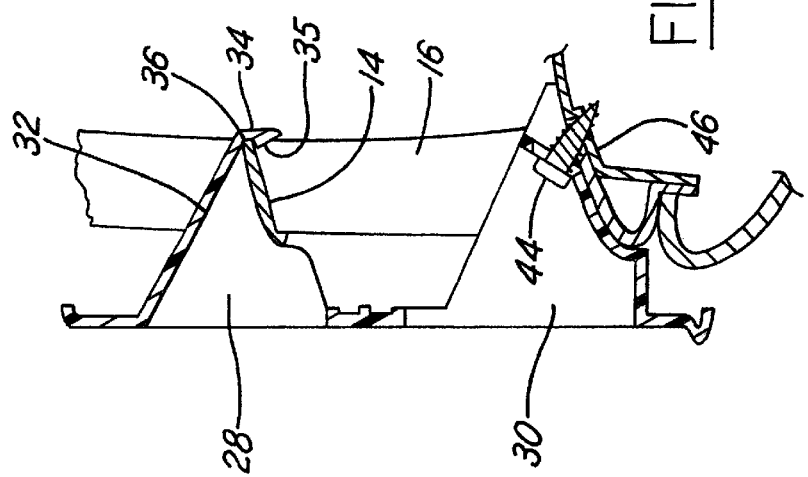
FIG. 8 is a view in section taken through section line 8—8 of FIG. 7.

A pair of upper molding recesses 28 is formed adjacent the upper corners of bracket 18 and a pair of lower molding recesses 30 is formed adjacent the lower corners of bracket 18. As seen in FIG. 4, tubular sleeves 27 provide support for the threads of the mounting screws. As best seen in FIGS. 2–6, a grip member in the form of a rearwardly projecting cantilevered grip arm 32, having a downwardly projecting hook 34, extends from the top of each upper molding recess 28.

A pair of sidewalls 33 provides support to the arm 32 and hook 34. Hook 34 is provided with a detent 35 dimensioned to form a secure resilient over-center snap-fit connection to the rear edge 36 of one of the horizontal ribs 14 of front grille 12. As seen in FIG. 5, the rear faces 37 of hooks 34, in top plan view, extend at an acute angle A with respect to the plane of bracket 18 to complement the shape and contours of the grille 12 and assist in centering the bracket on the grille.

A mounting arm 38 or flange, reinforced by a pair of sidewalls 40, extends rearwardly from the bottom of each lower molding recess 30. A mounting hole 42 is formed on the end of each mounting arm 38 for receiving a fastener such as the self-tapping mounting screw 44 shown in FIG. 2. When each mounting screw 44 is torqued down, it threads itself into a portion 46 of grille 12 to securely anchor the bracket 18 in position. Grille 12 is typically formed of a plastic material.

A locator or positioning member in the shape of a rearwardly projecting tab 48 having a recess 50 formed on its free end aids in the proper positioning of the bracket 18 on the grille 12. The recess 50 is shaped to engage and self-center on one of the vertical ribs 16 of grille 12. Tab 48 can be aligned with and connected to one of the tubular sleeves 27 to add strength and rigidity to the sleeve. A similar tab 52 can be provided to add support to the other tubular sleeve.

The rear face 54 of the bracket 18 may be provided with a series or pattern of raised ribs 56 for strengthening and adding rigidity to the bracket. Further rigidity may be provided by a rearwardly extending rectangular flange 58 which forms an outer border around bracket 18.

Bracket 18 as well as all of the structure carried by bracket 18, that is, the entire construction as best shown in FIGS. 3 and 4, can be formed as a single homogeneous plastic molding. This reduces cost and simplifies assembly.

The mounting of bracket 18 to grille 12 is extremely simple and fast. With the arms 32 and hooks 34 positioned over the appropriate horizontal rib 16, an installer provides a moderate downward force on the bracket, causing the detents 35 of hooks 34 to resiliently snap in place over the rear edge 36 of the rib. The bracket is then laterally adjusted, if necessary, to align the recesses 50 of tab 48 with the appropriate vertical rib 16 of grille 12. Self-tapping fastener screws 44 are then torqued down into the grille to complete the installation.

It should be noted that in those cases where a front license plate is not required, the bracket 18 may simply be eliminated. Since the front grille 12 need not be modified to accommodate bracket 18, the grille without the bracket will appear natural with smooth continuous lines and features insofar as special planar recesses or flattened shapes formed in the grille are not required for bracket 18.

Another embodiment of the invention is shown in FIGS. 7–12 wherein hold down tabs 24 are moved to the bottom edge of the bracket 18 and mounting holes 26 are moved toward the top of the bracket. In this design, the locator tab 48 and recess 50 are moved to the upper central portion of the rear surface 54 of bracket 18.

Many modifications and variations of the present invention are possible in light of the above teachings. Therefore, within the scope of the appended claims, the present invention may be practiced other than specifically described.

We claim:

1. In combination, a vehicle grille formed as a lattice of spaced vertical bars and spaced horizontal bars, and a license plate bracket for mounting a license plate on the grille comprising a rectangular support member for supporting the license plate, a first pair of laterally spaced arms carried by and projecting rearwardly from said support member, a second pair of laterally spaced arms beneath said first pair of arms carried by and projecting rearwardly from said support member, the arms of one of said pairs having rear edge portions terminating in hooks engaged over a selected one of the horizontal bars of the grille to support the support member on the grille, said hooks each having a detent engaging a rear edge of said one of said horizontal bars to provide a secure, resilient, over-center connection to said rear edge of said one of the horizontal bars, the arms of the other of said pairs being formed to receive fasteners which secure the support member to the grille, and a tab carried by and projecting rearwardly from said support member having a recess engaging one of the vertical bars of the grille to laterally locate the support member with respect to the grille, wherein said grille has a predetermined design contour of smooth, continuous lines, and is not modified to accommodate the license plate bracket, so that if the license plate bracket is not applied to the grille, its absence is not apparent.

2. The combination as defined in claim 1 further including tubular sleeves carried by and projecting rearwardly from said support member adapted to threadedly receive screws for attaching the license plate to said support member, said first and second pair of arms, said tab and said tubular sleeves being of integral, one-piece construction with said support member.

\* \* \* \* \*